US010307950B2

United States Patent
Qu et al.

(10) Patent No.: US 10,307,950 B2
(45) Date of Patent: Jun. 4, 2019

(54) VOLUME PULSED DEFORMATION PLASTICATING AND CONVEYING METHOD AND DEVICE BY ECCENTRIC ROTOR

(71) Applicants: South China University of Technology, Guangzhou, Guangdong Province (CN); GUANGZHOU HUAXINKE INTELLIGENT MANUFACTURING TECHNOLOGY CO., LTD., Guangzhou (CN)

(72) Inventors: Jinping Qu, Guangzhou (CN); Guizhen Zhang, Guangzhou (CN); Xiaochun Yin, Guangzhou (CN)

(73) Assignees: SOUTH CHINA UNIVERSITY OF TECHNOLOGY, Guangzhou (CN); GUANGZHOU HUAZINKE INTELLIGENT MANUFACTURING TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 15/310,907

(22) PCT Filed: Jul. 13, 2015

(86) PCT No.: PCT/CN2015/083888
§ 371 (c)(1),
(2) Date: Nov. 14, 2016

(87) PCT Pub. No.: WO2015/172751
PCT Pub. Date: Nov. 19, 2015

(65) Prior Publication Data
US 2017/0080619 A1 Mar. 23, 2017

(30) Foreign Application Priority Data
May 15, 2014 (CN) .................. 2014 1 0206552 A

(51) Int. Cl.
*B29C 45/46* (2006.01)
*B29C 45/20* (2006.01)
(Continued)

(52) U.S. Cl.
CPC .............. *B29C 45/46* (2013.01); *B29B 7/425* (2013.01); *B29B 7/429* (2013.01); *B29C 45/20* (2013.01);
(Continued)

(58) Field of Classification Search
CPC ... B29C 47/08; B29C 47/0803; B29C 47/385; B29C 47/44
(Continued)

(56) References Cited

U.S. PATENT DOCUMENTS 2,313,705 A * 3/1943 Jack .......................... A23G 1/18
165/109.1
2,995,346 A * 8/1961 Samples ............. B01F 7/00816
165/109.1
(Continued)

*Primary Examiner* — Nahida Sultana
(74) *Attorney, Agent, or Firm* — JMB Davis Ben-David

(57) ABSTRACT

The present invention relates to a volume pulsed deformation plasticating and conveying method and device by an eccentric rotor. The rotation of the eccentric rotor and the rolling of the rotor in the inner cavity of a stator during constant reverse revolutions cause the volume of the material between the eccentric rotor and the stator to periodically change alternatively along the axial direction and the radial direction of the stator, thereby enabling the volume pulsed deformation plasticating and conveying of the material. The volume pulsed deformation plasticating and conveying device consists of a stator, of which the inner cavity comprises multiple alternatingly disposed spiral segments and straight segments, and an eccentric rotor comprising multiple alternatingly disposed eccentric spiral segments and eccentric straight segments. The eccentric rotor is disposed in the inner cavity of the stator. The eccentric spiral seg- (Continued)

ments and the eccentric straight segments of the eccentric rotor correspond one-to-one with the spiral segments and straight segments of the stator. The present invention can be used as the extruding system of an extruder or be combined with different plunger injection units to form a plasticating injection device of an injection molding machine. The present invention has a short thermo-mechanical distance for the materials, low energy consumption, and wide adaptability.

7 Claims, 3 Drawing Sheets

(51) Int. Cl.
| | |
|---|---|
| B29C 45/54 | (2006.01) |
| B29C 45/60 | (2006.01) |
| B29B 7/42 | (2006.01) |
| B29C 45/62 | (2006.01) |
| B29C 47/60 | (2006.01) |
| F04C 2/08 | (2006.01) |
| F04C 2/107 | (2006.01) |
| B29C 47/66 | (2006.01) |
| B29C 47/00 | (2006.01) |
| B29C 45/48 | (2006.01) |
| B29C 47/36 | (2006.01) |
| B29C 47/64 | (2006.01) |
| B29B 7/72 | (2006.01) |
| B29C 47/38 | (2006.01) |

(52) U.S. Cl.
CPC .............. *B29C 45/48* (2013.01); *B29C 45/54* (2013.01); *B29C 45/60* (2013.01); *B29C 45/62* (2013.01); *B29C 47/00* (2013.01); *B29C 47/0009* (2013.01); *B29C 47/368* (2013.01); *B29C 47/60* (2013.01); *B29C 47/64* (2013.01); *B29C 47/665* (2013.01); *B29C 47/666* (2013.01); *F04C 2/084* (2013.01); *F04C 2/1073* (2013.01); *B29B 7/72* (2013.01); *B29C 47/385* (2013.01); *B29C 47/6031* (2013.01); *F04C 2210/10* (2013.01); *F04C 2210/44* (2013.01); *F04C 2250/20* (2013.01)

(58) Field of Classification Search
USPC ............................ 366/78–79, 82, 96, 98, 100
See application file for complete search history.

(56) References Cited

U.S. PATENT DOCUMENTS

| | | | | |
|---|---|---|---|---|
| 5,013,233 | A * | 5/1991 | Semmekrot | B29B 7/421 264/349 |
| 5,694,833 | A * | 12/1997 | Wenger | B29B 7/42 366/82 |
| 5,749,649 | A * | 5/1998 | Schobert-Csongor | B29B 7/12 366/76.4 |
| 5,988,866 | A * | 11/1999 | Barr | B29B 7/421 366/80 |
| 6,241,375 | B1 * | 6/2001 | Wang | B29C 47/0825 366/82 |
| 6,312,148 | B1 * | 11/2001 | Deal | B29B 7/421 366/75 |
| 6,588,925 | B1 * | 7/2003 | Hilder | B01F 7/00766 366/304 |
| 8,573,828 | B2 * | 11/2013 | Qu | B01F 5/12 366/76.93 |
| 2007/0183254 | A1 * | 8/2007 | Schobert-Csongor | B01F 7/00816 366/82 |
| 2009/0040862 | A1 * | 2/2009 | Knauff | B29C 45/5008 366/78 |
| 2009/0230223 | A1 * | 9/2009 | Stall | B29B 7/94 241/5 |
| 2013/0316037 | A1 * | 11/2013 | Williams | A23P 1/12 425/280 |
| 2016/0121518 | A1 * | 5/2016 | Holler | B29C 33/044 425/363 |

* cited by examiner

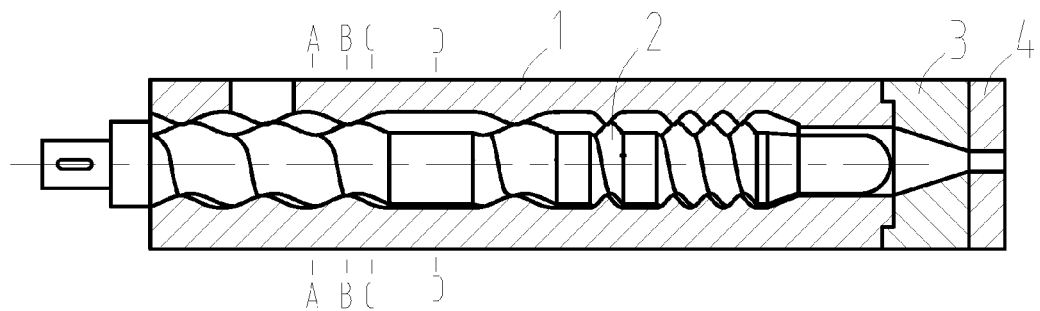
Fig. 1
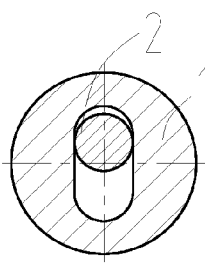     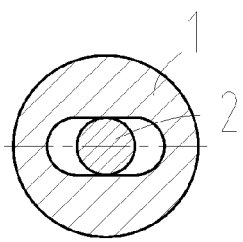     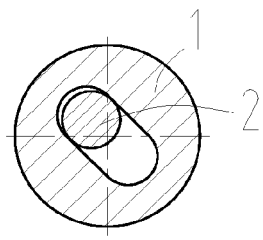
Fig. 2          Fig. 3          Fig. 4

VOLUME PULSED DEFORMATION PLASTICATING AND CONVEYING METHOD AND DEVICE BY ECCENTRIC ROTOR

FIELD OF THE INVENTION

The present invention relates to the field of plasticating processing technology of polymer materials, particularly a volume pulsed deformation plasticating and conveying method and device by an eccentric rotor.

BACKGROUND OF THE INVENTION

In polymer materials processing, the materials are all plasticated and melted by a plasticating and conveying device and delivered to a die having a specific shape to form an article. On one hand, the plasticating and conveying process of the polymer materials occupies most of the energy consumption in processing the polymer materials; on the other hand, in the plasticating and conveying process of polymer materials, it is possible to fill the polymer material matrix with different types of inorganic fillers and various plant fibers, or blend different types of polymer materials to obtain high-performance composite polymer materials, so as to meet the needs of contemporary industry development. The plasticating and conveying process of polymer materials plays a decisive role in reducing the energy consumption, improving the mixing effect of polymer materials and improving the product performance. Therefore, changing plasticating and conveying in polymer materials processing can meet the development needs of the polymer material processing technology.

Currently, the plasticating and conveying technology and equipment of polymer materials widely used at home and abroad mainly takes a screw as the core component and principle feature; however, due to the shear drag processing principle of the screw, the equipment of this structure commonly has such defects as high energy consumption, poor dispersing and mixing effects, a long thermo-mechanical distance, large-scale equipment, and hard processing of complex materials.

While the plasticating and conveying method of a polymer-material blade based on elongation rheology forces the materials to be melted, plasticated and mixed through the periodic change in the processing volume of the materials, wherein flow and deformation of the materials are mainly controlled by the tensile stress, and the principal velocity gradient is in the same direction as its principal flow and deformation, which exhibit the elongation rheology behavior, thus solving the problem that the plasticating capacity of the screw processing machinery mainly depends on the external and internal frictions of the materials. Compared with the screw plasticating and conveying method, the blade plasticating and conveying method has such advantages as low energy consumption, a short thermo-mechanical distance, high adaptability to materials, and good dispersing and mixing effects. However, in the blade plasticating and conveying process, the polymer material conveying channel is non-streamlined and has a dead end, which is not conducive to plasticization and mixed modification of the processed thermo-sensitive polymer materials.

Thus, in view of the problems with the current plasticating and conveying process, for polymer materials processing, it is of great significance to develop a new plasticating and conveying method and device with such advantages as low energy consumption, a short thermo-mechanical distance, high adaptability to materials, and good dispersing and mixing effects, with the plasticating and conveying channel streamlined, having no dead end, and easy to exhaust.

Contents of the Invention

For overcoming the defects of the prior art, a purpose of the present invention is to provide a volume pulsed deformation plasticating and conveying method by an eccentric rotor, so as to solve the problems with processing the polymer materials, i.e., a long thermo-mechanical distance experienced by the materials, high energy consumption, dead ends in the flow channel and other issues.

Another purpose of the present invention is to provide a volume pulsed deformation plasticating and conveying device by an eccentric rotor that implements the above method.

A technical solution of the present invention is as follows:

A volume pulsed deformation plasticating and conveying method by an eccentric rotor is provided. The rolling effect of an eccentric rotor in the inner cavity of a stator, during rotations of the eccentric rotor and during constant speed reverse rotations of the eccentric rotor cause the volume of the material between the eccentric rotor and the stator to periodically change alternatively along the axial direction and the radial direction of the stator, thereby enabling the volume pulsed deformation plasticating and conveying of the material.

A plasticating and conveying device by an eccentric rotor and having pulsed volume deformation that uses the above method is provided, comprising a stator and an eccentric rotor disposed in the inner cavity of the stator; the eccentric rotor comprises multiple alternatingly disposed eccentric spiral segments and eccentric straight segments of the rotor; the inner cavity of the stator comprises multiple alternatingly disposed spiral segments and straight segments of the stator; the eccentric spiral segments of the rotor correspond one-to-one with the spiral segments of the stator, and the eccentric straight segments of the rotor correspond one-to-one with the straight segments of the stator. In the feeding direction of the materials, the pitch of the respective eccentric spiral segments of the rotor on the eccentric rotor is gradually reduced, and so is the pitch of the respective spiral segments of the stator in the inner cavity of the stator. In the inner cavity of the stator, the radial sections of the spiral segments and the straight segments of the stator are long holes. When the eccentric rotor rotates, the eccentric rotor will be forced to perform rotation and constant reverse revolution at the same time because of the structural limitations of the inner cavity of the stator. The eccentric rotor reciprocates in the long hole of the inner cavity of the stator, with the motion stroke being twice the maximum eccentricity of the eccentric rotor.

cause the volume of the space between the eccentric rotor and the stator to periodically change alternatively along the axial direction and the radial direction of the stator, and the materials between the stator and the eccentric rotor receive the pulsed volume deformation when periodically compressed and released, thus completing the plasticating and conveying process including solid compacting, exhausting, melt plasticating, mixing, and melt delivering.

The volume pulsed deformation plasticating and conveying device of the above structure by an eccentric rotor can be used as the extruding system of a plasticating extruder of the eccentric rotor, or be combined with different plunger injection units to form a plasticating injection device of an injection molding machine.

The present invention has the following beneficial effects compared to the prior art:

1. By changing the structure of the eccentric rotor and the inner cavity of the stator, the conveying volume of the materials is periodically changed alternatively along the axial direction and the radial direction of the stator, which strengthens the mass-heat transfer effect of the plasticating and conveying process of the polymer materials, and is conducive to shortening the thermo-mechanical distance and reducing energy consumption, and improves the dispersing and mixing effects as well.

2. In the plasticating and conveying process, the flow channel can be streamlined without dead ends, which is conducive to plasticization and mixed modification of the processed thermo-sensitive polymer materials; by controlling the mating gap between the eccentric rotor and the stator, the exhaust capacity of the plasticating and conveying process can be effectively controlled.

3. The plasticating and conveying device of the present invention is simple in structure and has wide adaptability to materials and products, and can be used as the extruding system of a plasticating extruder of the eccentric rotor or be combined with different plunger injection units to form a plasticating injection device of an injection molding machine.

BRIEF DESCRIPTION OF THE DRAWINGS

FIG. 1 is a schematic diagram of the structure of this volume pulsed deformation plasticating and conveying device by an eccentric rotor.

FIG. 2 is a sectional view taken along Line A-A in FIG. 1.

FIG. 3 is a sectional view taken along Line B-B in FIG. 1.

FIG. 4 is a sectional view taken along Line C-C in FIG. 1.

DETAILED DESCRIPTION OF THE EMBODIMENTS

The present invention will be further described below in detail with reference to examples and drawings; however, the embodiments of the present invention are not limited thereto.

Example 1

The plasticating and conveying device of this example by an eccentric rotor and having pulsed volume deformation is used as the extruding system of a plasticating extruder of the eccentric rotor.

As shown in FIG. 1, the plasticating extruder of the eccentric rotor mainly consists of a plasticating and conveying device by an eccentric rotor and having pulsed volume deformation, a transition sleeve 3, a die 4 and other parts; the plasticating and conveying device by an eccentric rotor and having pulsed volume deformation comprises a stator 1 and an eccentric rotor 2 disposed in the inner cavity of the stator 1; the transition sleeve 3 is connected to the stator 1, and the die 4 is connected to the transition sleeve 3. The eccentric rotor comprises multiple alternatingly disposed eccentric spiral segments and eccentric straight segments of the rotor; the inner cavity of the stator comprises multiple alternatingly disposed spiral segments and straight segments of the stator; and the eccentric spiral segments and the eccentric straight segments of the rotor correspond one-to-one with the spiral segments and straight segments of the stator. Wherein changes of different sections are as shown in FIG. 2, 3 or 4 when the eccentric spiral segments of the rotor is connected with the spiral segments of the stator. In the feeding direction of the materials, the pitch of the eccentric spiral segments of the rotor and the spiral segments of the stator are gradually reduced.

Figure 5:
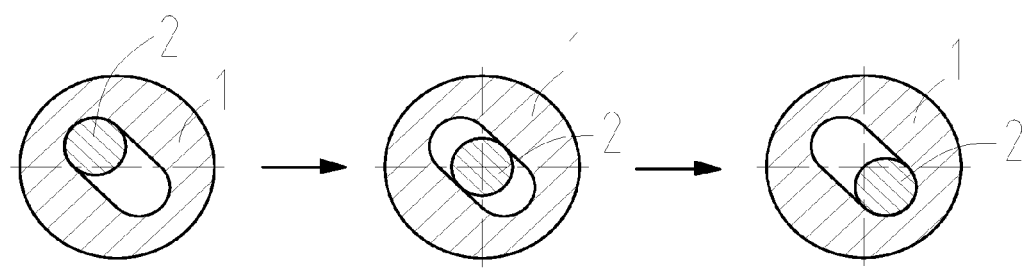
FIG. 5 is a schematic diagram of the motion state of the eccentric rotor in the inner cavity of the stator on the C-C section in FIG. 1.
Figure 6:
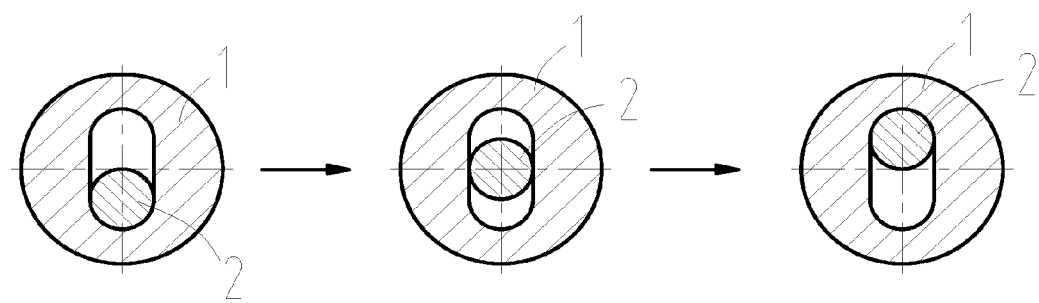
FIG. 6 is a schematic diagram of the motion state of the eccentric rotor in the inner cavity of the stator on the D-D section in FIG. 1.

As shown in FIG. 5 or 6, the radial sections of the spiral segments and the straight segments of the inner cavity of the stator are long holes, and the eccentric rotor reciprocates in the long hole of the inner cavity of the stator, with the motion stroke being twice the maximum eccentricity of the eccentric rotor. The rolling effect of an eccentric rotor in the inner cavity of a stator, during rotations of the eccentric rotor and during constant speed reverse rotations of the eccentric rotor cause the volume of the space between the eccentric rotor and the stator to periodically change alternatively along the axial direction and the radial direction of the stator, and the materials between the stator and the eccentric rotor receive the pulsed volume deformation when cyclically compressed and released, thus completing the plasticating and conveying process including solid compacting, exhausting, melt plasticating, mixing, and melt delivering.

This example can achieve a volume pulsed deformation plasticating and conveying method by an eccentric rotor through the above device, wherein the rolling effect of an eccentric rotor in the inner cavity of a stator, during rotations of the eccentric rotor and during constant speed reverse rotations of the eccentric rotor cause the volume of the material between the eccentric rotor and the stator to periodically change alternatively along the axial direction and the radial direction of the stator, thereby enabling the volume pulsed deformation plasticating and conveying of the material. The material, after plasticated by the volume pulsed deformation plasticating and conveying device by an eccentric rotor, is extruded by a die 4 connected to the transition sleeve 3, cooled, and shaped to produce an article.

Example 2

The volume pulsed deformation plasticating and conveying device of this example by an eccentric rotor is combined with an injection unit to form a plasticating injection device of the eccentric rotor.

Figure 7:
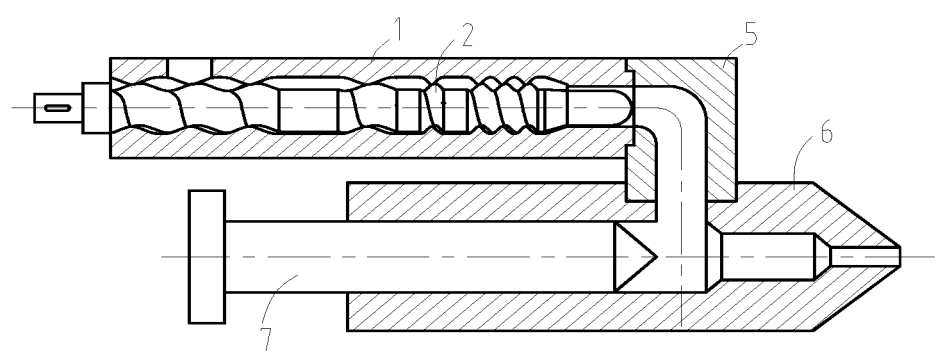
FIG. 7 is a schematic diagram of the structure of the plasticating injection device of the eccentric rotor.

This example is different from Example 1 in the follow aspect: As shown in FIG. 7, the output end of the stator is connected to a cylinder 6 of the injection unit through an accumulator 5, and the inner cavity of the stator is communicated with the injection channel in the cylinder, with a plunger 7 provided in the injection channel.

While in use, this volume pulsed deformation plasticating and conveying device by an eccentric rotor plasticates and melts the material, and delivers it into the injection channel of the cylinder, with the plunger constantly moving backward. When the storage amount of the polymer material melt in the cylinder reaches the measured value required by the injection products, this volume pulsed deformation plasticating and conveying device by an eccentric rotor stops plasticating and melting, and the plasticating measuring process of the injection machine is ended. After the injection machine completes the processes of filling the die and retaining the pressure, the plasticating extruder of the eccentric rotor begins to plasticize in the cooling stage of the product, with the injection machine starting a new cycle of molding products.

The present invention can be well implemented as described above. The examples as described above are only the preferred examples of the present invention, and are not intended to limit the scope of the present invention; that is, it is intended that variations and modifications consistent with the present invention be encompassed by the scope of the present invention as defined by the appended claims.

What is claimed is:

1. A method for volume pulsed deformation plasticating and conveying by an eccentric rotor, comprising:
    rotating an eccentric rotor in a forward direction in the inner cavity of a stator; and
    rotating the eccentric rotor in a constant speed reverse rotation,
    wherein rotating the eccentric rotor in the forward direction and the constant speed reverse rotation causes the volume of materials between the eccentric rotor and the stator to periodically change alternatively along the axial direction and the radial direction of the stator, thereby enabling the volume pulsed deformation plasticating and conveying of the materials.

2. A device comprising a stator and an eccentric rotor disposed in the inner cavity of the stator wherein the eccentric rotor comprises multiple alternatingly disposed eccentric spiral segments and eccentric straight segments,
    the inner cavity of the stator comprises multiple alternatingly disposed spiral segments and straight segments,
    the eccentric spiral segments of the eccentric rotor correspond to the spiral segments of the stator, and
    the eccentric straight segments of the eccentric rotor correspond to the straight segments of the stator;
    wherein the stator and the eccentric rotor are configured such that the eccentric rotor can be rotated in both a forward direction and at a constant speed in a reverse direction.

3. The volume pulsed deformation plasticating and conveying device by an eccentric rotor according to claim 2, wherein in the feeding direction of the materials, the pitch of the respective eccentric spiral segments of the eccentric rotor are gradually reduced, and the pitch of the respective spiral segments of the stator in the inner cavity of the stator are gradually reduced in the feeding direction of the materials.

4. The volume pulsed deformation plasticating and conveying device by an eccentric rotor according to claim 2, wherein in the inner cavity of the stator, a radial sections of the spiral segments and the straight segments of the stator are elongated.

5. The volume pulsed deformation plasticating and conveying device by an eccentric rotor according to claim 4, wherein in the elongated radial cross-section of the stator and the eccentric rotor, the eccentric rotor reciprocates in the inner cavity of the stator, with a motion stroke being twice the maximum eccentricity of the eccentric rotor.

6. The volume pulsed deformation plasticating and conveying device by an eccentric rotor according to claim 2, wherein the volume pulsed deformation plasticating and conveying device by an eccentric rotor is used as an extruding system of an extruder.

7. The volume pulsed deformation plasticating and conveying device by an eccentric rotor according to claim 2, wherein the volume pulsed deformation plasticating and conveying device by an eccentric rotor is combined with a plunger injection unit to form a plasticating injection device of an injection molding machine.

* * * * *